May 6, 1969  M. MENDELSON  3,442,389
DESALINIZATION APPARATUS
Filed April 17, 1967
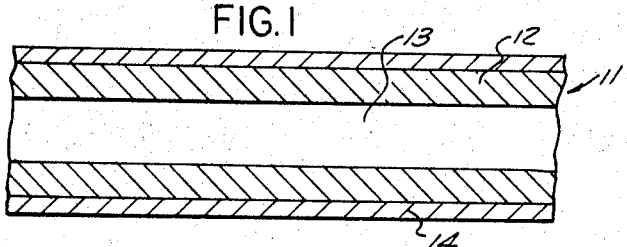
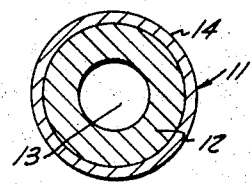
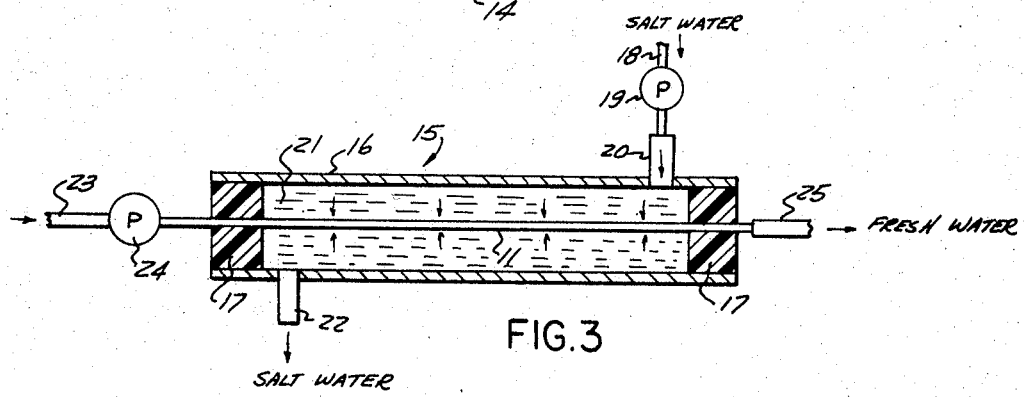
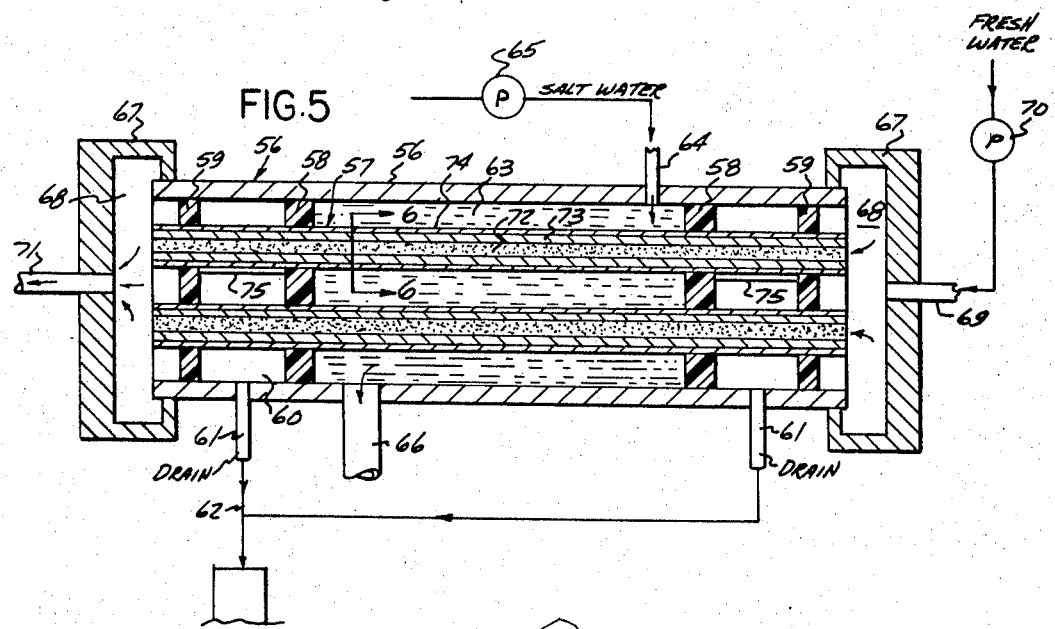
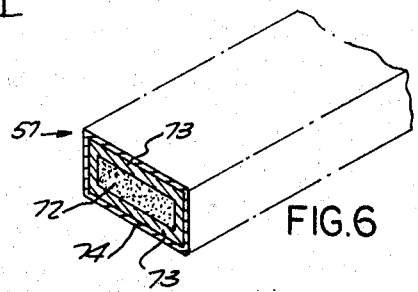
INVENTOR
MORRIS MENDELSON
BY Cullen, Sloman, & Cantor
ATTORNEYS

United States Patent Office 3,442,389
Patented May 6, 1969

3,442,389
DESALINIZATION APPARATUS
Morris Mendelson, 16156 Oxley Road,
Southfield, Mich. 48075
Filed Apr. 17, 1967, Ser. No. 631,547
Int. Cl. C02b 1/82; B01d 13/00
U.S. Cl. 210—321                                    5 Claims

ABSTRACT OF THE DISCLOSURE

Apparatus for desalinating sea water which includes a housing with end walls and headers spaced inwardly thereof defining fresh water chambers and between the said headers a salt water chamber with an inlet connected to a source of salt water under pressure connected with said salt water chamber and an outlet connected to said salt water chamber, and a series of tubular cartridges within the housing mounted between the said headers with their outlets in communication with the fresh water chambers, and a plurality of semipermeable membranes nested and sealed within each cartridge body.

---

The present invention relates to the desalinating of sea water and more particularly to apparatus for such purpose.

It is an object of the present invention to provide a low cost apparatus for the desalinating of seat water utilizing the principles of reverse osmosis and which incorporates the use of a plurality of cartridges in apparatus and wherein each individual cartridge houses a large number which may be many hundreds or many thousands of permeable membrane assemblies arranged in such a manner as to on their exterior be exposed to the continuous flow of salt water under pressure and which, due to the semipermeability of said membranes, will transmit to the interior of the individual membrane assemblies fresh water in a continuous process.

Heretofore many efforts have been extended for apparatus which will desalinate sea water and wherein attempts have been made to utilize the principle of reverse osmosis.

Normally speaking the solution of salt water and a solution of fresh water are stored in a container with a permeable membrane therebetween, under normal principles of osmosis, fresh water will permeate into and through the membrane into the salt water solution, being of greater specific gravity. This process can be reversed by the application of pressure to the chamber confining the salt water and employing a semipermeable membrane through which only fresh water will flow. Under such conditions known as reverse osmosis continuous flow of salt water under pressure applied to a semipermeable membrane has the capability of transmitting through the said membrane only the fresh water as a part of a desalinating process.

It is therefore an object of the present invention to incorporate this principle into apparatus which will accomplish this result in an inexpensive manner rendering the same practical for commercial usage.

Heretofore the capital costs of such apparatus were high because the volume of material per square foot of semipermeable membrane was high.

By putting the semipermeable membranes around the porous material in the form of a tube or flat ribbon and having the high pressure on the outside all around the membrane with outlets for fresh water at the ends, the tubes and ribbons can be made very thin, they can be packed loosely and the area of semipermeable membrane which can be packed into a given volume is very much increased. This will reduce capital costs a great deal.

It is an object to provide at least four features in this apparatus which cut down leakage between the high pressure side with salt water and the low pressure side with fresh water.

(1) Membrane tubes or ribbons are long so that seals between high pressure side and low pressure side need not be large for a given total membrane area.

(2) Double seals, one at each high pressure end, and one at each end of the membrane tubes or ribbons are provided. Escape is provided for any leakage to the outside.

(3) Provision of an intermediate permeability membrane between semipermeable membrane and glass fibre center in the membrane ribbons limit leakage in case of break in semipermeable membrane.

(4) Ends of membrane tubes or ribbons are accessible from the outside without breaking any seals. In case one or more membrane tubes or ribbons begin to leak, they can be sealed off at both ends, the leak stopped and the rest of the apparatus will not be affected.

These and other objects will be seen from the following specification and claims in conjunction with the appended drawings in which:

FIG. 1 is a fragmentary elevational view on a greatly increased scale of a single semipermeable membrane assembly.

FIG. 2 is an end view thereof.

FIG. 3 is a schematic illustration of the desalinization apparatus in its simplest form.

FIG. 5 is a longitudinal section on an enlarged scale and in fragmentary form showing another form of desalinization and the cartridge assembly.

FIG. 6 is a fragmentary section taken in the direction of arrows 6—6 of FIG. 5.

Figure 4:
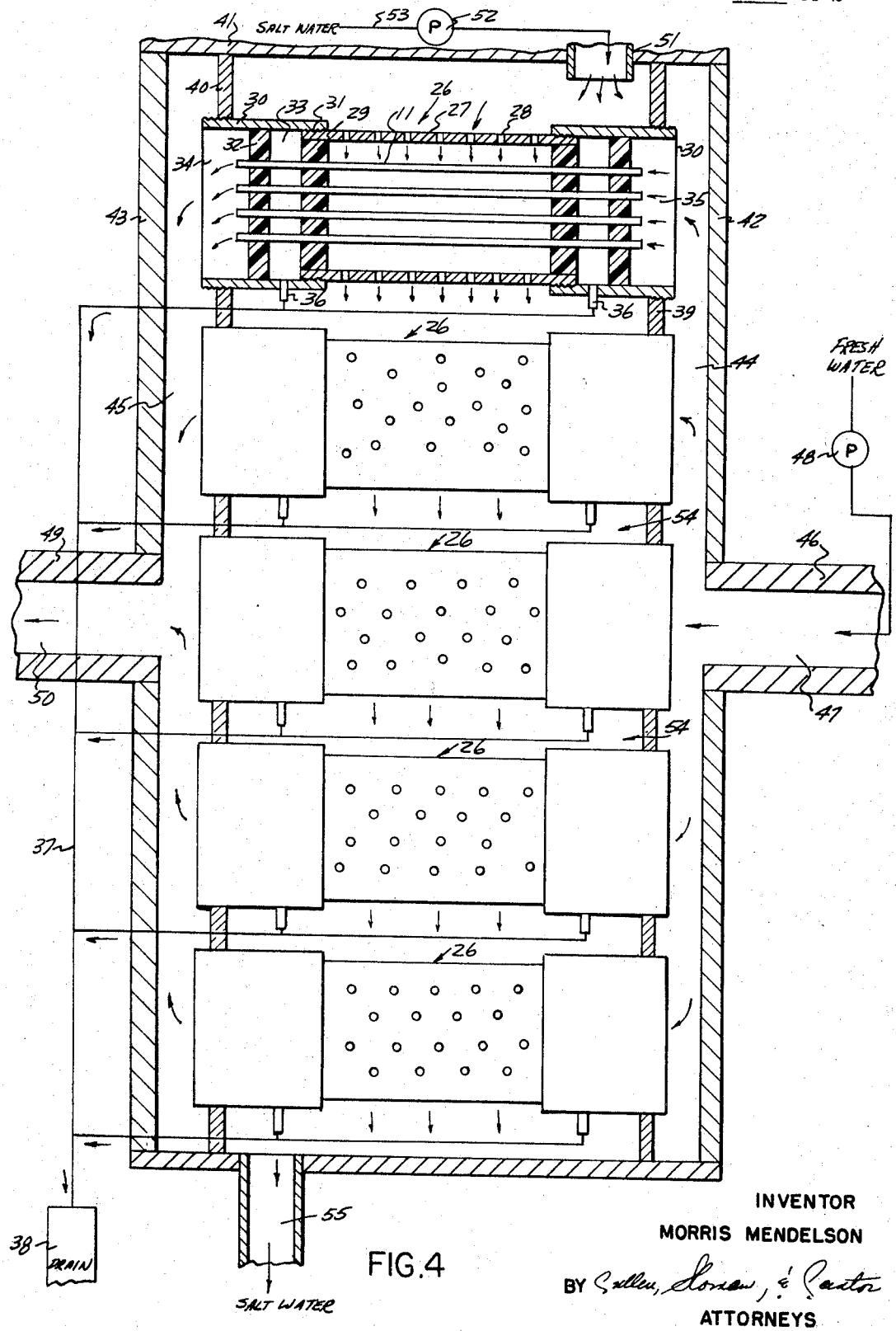
FIG. 4 is a fragmentary vertical section of the present desalinization apparatus with one of the cartridges broken away and sectioned for illustration.

It will be understood that the above drawings illustrate merely a preferred illustrative embodiment of the invention, and that other embodiments of the apparatus are contemplated within the scope of the claims hereafter set forth.

Referring to the drawings one form of the present semipermeable membrane assembly is illustrated in FIG. 1 generally indicated at 11; namely, a semipermeable membrane assembly. This assembly includes preferably plastic or other form of permeable support body 12 made from a porous material such as Permaplex A–10, as described on page 339 of an article, entitled Medium Permeable Support Membranes, written by Sidney B. Tuwiner in the publication, entitled "Diffusion and Membrane Technology," published by American Chemical Society, Monograph Series No. 156.

In accordance with this process hollow fibers 12 are drawn from this porous material; namely, a suitable plastic material which has the characteristic of high permeability to salt water and fresh water. In the illustrative embodiment shown in FIG. 1 the permeable plastic body 12, is tubular and elongated.

This permeable fiber body 12, for illustration has an O.D. of .002 inch approximately and an I.D. of .001 inch approximately, thus providing the wall thickness of approximately .0005 inch for illustration.

It is contemplated that the I.D. could range for example between .001–.100 inch approximately and that the O.D. could vary between .002 and .250 inch approximately.

The hollow fiber support body is extruded as a hollow continuous fiber from the selective material which is highly permeable to both water and salt and such as the Permaplex A–10, referred to above, and as a further step in the process the fiber as it is extruded is run through a solution of a semipermeable membrane material such as cellulose acetate to thus define the thin semipermeable membrane 14 which has a characteristic of being permeable only to fresh water and impermeable to salt water. In the illustrative embodiment the thickness of this layer is approximately .0001 inch, but may be varied to a thickness as high as .0005 inch and is referred to hereafter as a semipermeable membrane or a cellulose acetate compound.

In the illustrative embodiment of the invention the semi-permeable material was developed by Sidney Loeb and S. Manjikian, being a formula which includes cellulose acetate and was disclosed in an article, entitled "Six Months Field Test on Membranes," published in Industrial and Engineering Chemistry Process Design and Development, April 1965, page 207. The membrane material is identified as follows and consists of the following ingredients by weight approximately:

| | Percent |
|---|---|
| Acetone | 69.4 |
| Cellulose acetate | 23.2 |
| Water | 5.43 |
| Magnesium perchlorate | 1.64 |
| Hydrochloric acid | 0.33 |

It has been found that the particular membrane material above defined including cellulose acetate as one of the basic ingredients provides a membrane which is permeable to fresh water but impermeable to salt water and thus a very satisfactory medium for utilization of the process of reverse osmosis in removing and separating fresh water from salt water in a desalinating process.

In the illustrative form of the semipermeable membrane assembly generally indicated at 11, FIG. 1, the central support body being reasonably permeable to salt and fresh water serves as a support medium for the very thin membrane cover 14, the said support body having an internal bore 13 through which preferably fresh water is transmitted within a cartridge assembly such as shown in FIGURE 4 and wherein a large plurality of such membrane assemblies are provided in a bundle forming a part of a single cartridge and wherein there may be many hundreds or thousands of said membrane assemblies for maximum surface exposure upon the exterior to salt water under pressure for the transmission therethrough under the principles of reverse osmosis into the interior bores 13 of the respective membrane assemblies and for transmission to the fresh water collection chambers such as hereafter described at 45 with respect to FIGURE 4.

Schematically FIGURE 3 shows the simplest form of desalinization of sea water applying the present apparatus generally indicated at 15 as a schematic form and including the elongated cylindrical cartridge body 16 which is sealed adjacent its opposite ends at 17 such as by an epoxy resin seal for illustration though not limited thereto and for thus defining within the body 16 a salt water chamber 21 adapted for connection to a source of salt water 18 through the pump 19 and inlet 20, there being a suitable outlet 22 by which a continuous stream of salt water under reasonably high pressure within the range of 200 to 2000 lb. per square inch is transmitted to the said cartridge body 16 and therethrough for application to the exterior surface of the membrane assembly 11 shown on enlarged scale in FIGURES 1 and 2.

The said membrane assembly 11 as above described extends longitudinally through the body 16 and may be in the form of a large bundle assembled in various manners by which there may be a very large number such as hundreds of such membrane assemblies within a single cartridge body 16 to which salt water on the exterior surface is applied under pressure.

The respective ends of the membrane assemblies 11 project through the seals 17 with the delivery of fresh water achieved by the reverse osmosis process through the conduit 25 utilizing fresh water supply or delivery conduit 23 and connected pump 24.

A more practical application of the present apparatus is shown in the enlarged view FIGURE 4, and wherein there is provided a housing for a plurality of desalinating cartridges 26, one of which is broken away and sectioned for illustration.

The cartridge 26 of which there may be a considerable large number within the housing shown in FIGURE 4 consists of an elongated body 27, which has a series of perforations or apertures 28 at certain portions inwardly of the first seals 29 of an epoxy resin or other substance for sealing within the said body 27. The bundle consisting of a large number, possibly many hundreds of membrane assemblies 11 such as described in connection with FIG. 1 or of the details shown in FIG. 5 and FIG. 6.

Mounted within the housing hereafter described are a plurality of cartridges such as shown in FIG. 4 designated at 26 and within each of the perforated bodies 27 employing a first sealing means 29. A large plurality of the present semipermeable membranes generally indicated at 11 are sealed and nested in bundles within the said body, said seals being located adjacent outer ends of the body 27 and within the respective cylindrical heads 30 connected to the said bodies at 31, being threaded thereon for illustration. By this assembly respective ends of the membrane assemblies 11 are sealed within the body and wherein the respective ends of the membrane assemblies communicate with the respective outlet 34 and inlet 35 within the said heads 30, which in turn communicate with the fresh water chambers 44 and 45 of the housing 41 including end walls 42 and 43.

In the illustrative embodiment of one form of the cartridge assembly shown in FIG. 4 the second seal 32, preferably of epoxy resin, for illustration, is mounted within the heads 30 forming a part of the bodies 27 and connected thereto, spaced outwardly from the first seals 29 to thus provide salt water leakage collection chambers 33. Thus the seals 29 may be regarded as high pressure seals and the seals 32 as low pressure seals and with any salt water contamination which gets past the seals 29 collecting within chamber 33. Suitable outlets 36 connect a drain pipe 37 to the drain 38 for the removal of any salt water leakage to prevent contamination of the fresh water portion of the present apparatus.

Inwardly of the end walls 42 and 43 of the housing 41 are a pair of upright apertured headers 39–40 which are adapted to supportably receive the respective bodies 27 and their connected heads 30 by which the respective end portions of said body, 34 and 35 are in communication with the fresh water chambers 44 and 45 adjacent opposite ends of said housing.

The cartridge supporting headers 39 and 40 as spaced from end walls 42 and 43 define the fresh water chambers 44 and 45 which communicate with the passage 47 in inlet 46 FIG. 4, and with passage 50 in outlet 49, there being a suitable pump 48 connected with the inlet 46 for transmission of fresh water to and through housing 41.

Between the headers 39 and 40 within said housing there is defined thereby the salt water chamber 54 and communicating therewith the inlet pipe 51 connected by the pump 52 to the source of salt water 53. Also communicating with the salt water chamber 54 is the outlet 55 upon the opopsite side of the said housing, FIG. 4, fragmentarily shown.

The cartridge 26, shown in FIG. 4, consists of a bundle of a large number of hundreds or thousands of membrane elements 11 of a construction such as shown in FIGS. 1 and 2. It is contemplated that the cartridge assembly could more nearly approach as desired the membrane assembly shown in FIGS. 5 and 6. FIG. 5 shows a simple form of desalinization apparatus employing a cartridge which could be applied to replace cartridges 26 if desired.

The cartridge 56, FIG. 5 is in the form of an elongated, preferably cylindrical body, which has nested and sealed therein a stack consisting of a series of membrane elements 57, whose cross sectional shape and detail is shown in FIG. 6.

The respective membrane elements in a stack, separated by spacers 75 adjacent their opposite ends, are nested within the elongated body 56 and sealed therein by the primary or high pressure seals 58 of epoxy resin or the like and which extend across the respective end portions of the stack of membrane elements 57, sealing the same with respect to each other and with respect to the body 56.

Second seals 59 known as low pressure seals extend across outer portions of the body 56 spaced outwardly from the seals 58 sealing across the stack of membrane elements 57 to define salt water seepage chambers 60 which have low pressure drain outlets 61 connected by drain pipe 62 for elimination of the said any leaking salt water which may occur past the high pressure seals 58 to prevent contamination of the fresh water.

Between the seals 58 there is provided a salt water chamber 63 and communicating therewith an inlet 64 connected to a salt water source and employing the pump 65 for delivering salt water under pressure to the interior of the chamber 63 then arranged between 200 lb. per square inch and 2000 lb. per square inch, as desired. Salt water outlet 66 also communicates with the salt water chamber 63.

The headers 67 are sealed over the rsepective ends of the elongated body 56 in communication with the outlet ends thereof and define the fresh water chambers 68 with inlet 69 and connected pump 70 and outlet 71 for transmitting fresh water obtained through the present reverse osmosis process.

The membrane elements 57 as shown in detail and on an enlarged scale in FIGURE 6 are of a slightly different construction from what is shown in FIGURE 1 and here said membrane element provides upon its interior an elongated ribbon like porous central support body 72 which is formed of a suitable porous material, as for example, fibreglass compacted as shown, and preferably rectangular in cross section. The central support body being porous is permeable to water as well as salt.

Surrounding the central body 72 there is provided an envelope of a medium porosity material such as the above Permaplex A–10 as designated at 73, which is of medium permeability and supportably encloses the central permeable body 72. There is also provided upon the exterior of the membrane assembly the additional semipermeable elongated enclosing ribbon-like envelope 74 of a cellulose acetate compound such as of the Loeb formula herein above described and which is permeable only to fresh water and impermeable to salt water. The respective membrane elements of which one is shown in FIGURE 6 are provided in a stack with suitable spacers 75 between their respective ends by which upon application of salt water under pressure to and through the chamber 63 a substantial portion of the length of the respective semipermeable membrane assemblies or stack 57 are exposed to the moving salt water with fresh water under the principle of reverse osmosis passing through the semipermeable membrane 74, the medium permeable support membrane 73 into the porous permeable membrane 72 for transmission through the respective ends thereof into the fresh water chamber 68 of header 67.

The intermediate support membrane 73 provides a certain amount of additional rigidity and support strength for the central pervious fresh water transmitting body 72 and at the same time due to its limited permeability protects the flow of fresh water from excessive contamination should there be a partial break or defect in the material which forms the thin outer envelope 74, which is permeable only to fresh water under normal conditions. Should there be a part leakage some place along the surface of the outer membrane element 74 due to the limited permeability of the intermediate envelope 73, insufficient salt water would pass into the porous body 72 to contaminate the flow of the fresh water therethrough in any appreciable quantity.

In connection with the fabricating method for the membrane assembly of FIG. 1 after the hollow fibre support body 12 has been extruded and passed through the solution of semipermeable membrane material above described it is dried and normally cooled to freezing, after which it is heated to approximate 80° C. as fully described by Loeb and Manjikian in their method of making semipermeable membranes for maximum permeability to water and rejection of salt, as above described.

Having described my invention, reference shown now be had to the following claims.

I claim:

1. Apparatus for desalinating sea water comprising a housing including closed end walls; headers sealed and secured upon the interior of the housing spaced inwardly of said end walls defining therewith a pair of fresh water chambers, and between said headers a salt water chamber;

an inlet pipe and an outlet pipe connected respectively to said fresh water chambers through said end walls, a pump connected to said inlet pipe;

a plurality of tubular cartridges within said housing, each cartridge consisting of an elongated tubular body with its respective ends projected through, sealed and secured to said headers and communicating with said fresh water chambers;

a bundle consisting of a plurality of spaced semipermeable membrances nested within said body extending axially thereof;

a sealing means within and extending across the bore of said body inwardly of its ends and adjacent the ends of and sealing said membranes therein so that the ends of said membranes communicate with the ends of said body and fresh water chambers; the wall of said body intermediate said sealing means being perforated throughout its length for communication with said salt water chamber;

an inlet and outlet respectively connected to opposite sides of said housing communicating with said salt water chamber for delivering sea water therethrough under pressure;

and for transmission to the interior of said cartridges for application to said membranes;

a pump connected to said salt water inlet;

each membrane consisting of an elongated fibre fluid transmitting body of plastic material permeable to water and salt;

and a thin cover of semipermeable membrane material impermeable to salt applied over the exterior surface of said fibre body whereby when salt water under pressure in the range between 200 and 2000 lb. per square inch is applied to the surfaces of said membranes of all the cartridges, fresh water by reverse osmosis will permeate through said membrane cover and through said body for transmission therethrough to one of said fresh water chambers.

2. In the apparatus of claim 1, said membrane sealing means defining a high pressure seal;

a second low pressure sealing means within said body spaced outwardly of said first sealing means defining salt water leakage collection chambers;

and outlets connected to each collection chamber and respectively connected to a drain upon the exterior of said housing to prevent salt water contamination of the fresh water.

3. In the apparatus of claim 1, the fibre body of said membranes being of a fibreglass material, rectangular in cross section and permeable to water and salt;

said membrane cover being an enclosing envelope of cellulose acetate compound sealed over said fibre body, of similar cross section and permeable to water and impermeable to salt.

4. In the apparatus of claim 1, the fibre body of said membranes being a porous material rectangular in cross section and permeable to water and salt;

a membrane cover being an enclosing envelope of cellulose acetate compound sealed over said fibre body being of similar cross section, permeable to water and impermeable to salt;

and an envelope of limited permeability interposed and sealed between said fiber body and said membrane cover for strengthening the membrane assembly and protecting against contamination in the event of a partial failure of the outer salt impermeable membrane.

5. A cartridge for desalinating sea water comprising an elongated tubular body;

a series of elongated membrane bundles in a stack, nested within and extending through said body;

spacers between each bundle;

each bundle consisting of an elongated central body of porous fibre glass material rectangular in cross section and permeable to water and salt;

an intermediate envelope of a compact porous material of medium permeability sealed over and enclosing said support body;

and an outer envelope of cellulose acetate compound sealed over and enclosing said intermediate envelope permeable to fresh water and impermeable to salt water;

a seal within and across said body inwardly of its ends adjacent the ends of and sealing said membrane bundles to and within said body so that the ends of said membrane bundles communicate with the respective ends of said body for the delivery of fresh water;

a salt water inlet adapted for connection to a source of salt water under pressure and a salt water outlet respectively connected to said body intermediate said seals defining a salt water chamber surrounding said membrane bundles by which when salt water under pressure is applied to the surfaces of said membrane bundles, fresh water by reverse osmosis will permeate through said membrane bundles to the central porous body thereof for transmission therethrough to one of the respective ends of said body for the delivery of fresh water therethrough;

chambered fresh water headers sealed over the ends of said body communicating with the respective ends of said semipermeable membranes; and an outlet connected to said headers respectively.

References Cited

UNITED STATES PATENTS

| | | | |
|---|---|---|---|
| 2,958,391 | 11/1960 | De Rosset | 55—16 |
| 2,961,062 | 11/1960 | Hunter et al. | 55—158 |
| 3,019,853 | 2/1962 | Kohman et al. | 55—158 X |
| 3,133,132 | 5/1964 | Loeb et al. | 264—49 |
| 3,135,591 | 6/1964 | Jones | 55—158 X |
| 3,198,335 | 8/1965 | Lewis et al. | 210—321 |
| 3,228,877 | 1/1966 | Mahon | 210—321 X |
| 3,246,764 | 4/1966 | McCormack | 210—321 |
| 3,342,729 | 9/1967 | Strand | 210—321 X |

REUBEN FRIEDMAN, *Primary Examiner.*

F. A. SPEAR, Jr., *Assistant Examiner.*

U.S. Cl. X.R.

210—416, 491